United States Patent
Dyck et al.

(10) Patent No.: US 7,587,492 B2
(45) Date of Patent: Sep. 8, 2009

(54) DYNAMIC PERFORMANCE MANAGEMENT FOR VIRTUAL SERVERS

(75) Inventors: Bill Dyck, Rocklin, CA (US); James Pratt, Granite Bay, CA (US); Greg Siino, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 713 days.

(21) Appl. No.: 11/193,079

(22) Filed: Jul. 29, 2005

(65) Prior Publication Data

US 2007/0028239 A1 Feb. 1, 2007

(51) Int. Cl.
*G06F 15/173* (2006.01)
*G06F 11/00* (2006.01)

(52) U.S. Cl. .............. 709/226; 709/223; 370/229; 714/4

(58) Field of Classification Search ............... None
See application file for complete search history.

*Primary Examiner*—Wen-Tai Lin (57) ABSTRACT

One embodiment in accordance with the invention is a method for enabling dynamic performance management for virtual servers. The method can include automatically detecting when a first physical server is operating beyond a threshold. Note that a plurality of virtual servers is operating on the first physical server. Also, it can be automatically determined which virtual server of the plurality of virtual servers is associated with the first physical server operating beyond the threshold. The virtual server associated with the first physical server operating beyond the threshold can be automatically moved to a second physical server to operate thereon.

14 Claims, 7 Drawing Sheets

DYNAMIC PERFORMANCE MANAGEMENT FOR VIRTUAL SERVERS

BACKGROUND

It is common for a company to purchase a physical server which is utilized in association with their business. However, one of the disadvantages is that only about 5-10% of the capabilities of the physical server may be utilized by that company. As such, the physical server is under-utilized. However, the use of virtual servers is slowly gaining acceptance. For example, instead of ten people buying ten physical servers, ten people can buy one server and split its cost ten ways. As such, each of the ten owners can have their own virtual server software operating on the commonly owned physical server. However, user acceptance of this situation is still inhibited due to concerns over shared server resources not being available during a peak load requirement for any given virtual server.

One conventional solution for providing for virtual server peak loads is to ensure that each host physical server has the resource capacity local to the physical system. As such, the number of virtual servers on any given host is usually limited such that if a majority of virtual servers required additional resources, those resources would normally be available. However, this conventional solution leads to the general under-utilization of the host.

It is understood that if more virtual servers were placed onto their host, the average utilization of the host would increase. However, the additional headroom available for peak capacity would also decrease, limiting the ability for a virtual server to obtain additional resources during peak usage. As more virtual servers are loaded onto a host, the headroom slowly disappears until there is no longer any capacity for peak loads on any given virtual server.

If a host server was loaded to this point and a virtual server experienced the need for additional resources, one of two side-effect conditions typically occurs. For example, if the virtual server experiencing peak usage requirements were a higher priority than other virtual servers on the host, it would obtain its required resource at the expense of the rest of the virtual servers on the host (e.g., which may be limited by user-defined minimums set for all virtual servers). Alternatively, if the virtual server experiencing peak usage requirements were the same priority as the rest, it could be blocked and not be assigned additional resources. Given either side-effect condition, the result is unpredictable and inconsistent performance characteristics for any given virtual server on a host and leads to the perception of resources not being available when they may be required.

The present invention may address one or more of the above issues.

SUMMARY

One embodiment in accordance with the invention is a method for enabling dynamic performance management for virtual servers. The method can include automatically detecting when a first physical server is operating beyond a threshold. Note that a plurality of virtual servers is operating on the first physical server. Also, it can be automatically determined which virtual server of the plurality of virtual servers is associated with the first physical server operating beyond the threshold. The virtual server associated with the first physical server operating beyond the threshold can be automatically moved to a second physical server to operate thereon.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 1A:
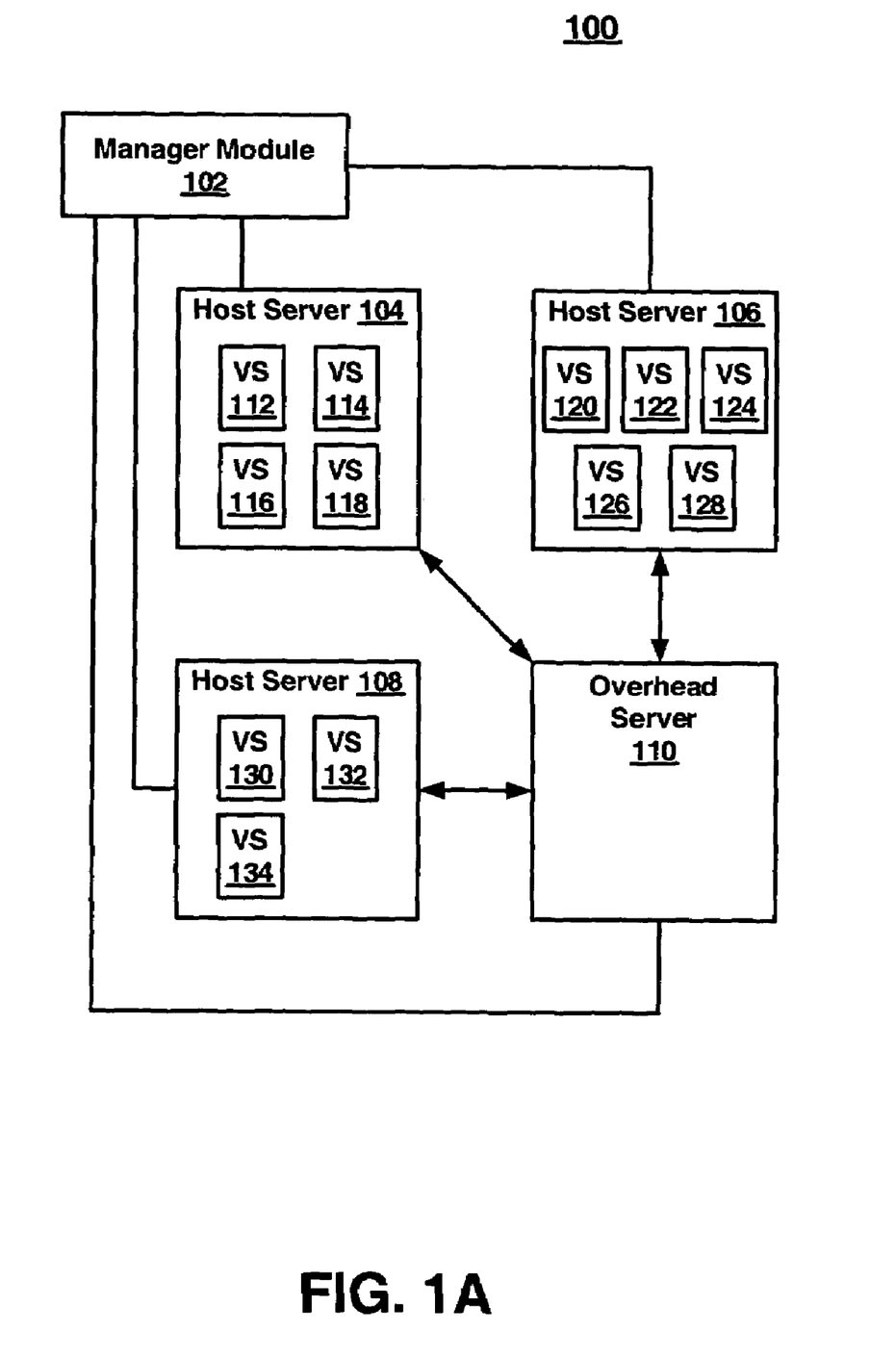
FIG. 1A is a block diagram of an exemplary system in accordance with various embodiments of the invention.

FIG. 1A is a block diagram of a shared environment system 100 wherein dynamic performance management can be implemented in accordance with various embodiments of the invention. Note that system 100 can provide a methodology that applies to any system where the host/instance relationship exists and can eliminate the mutually exclusive nature associated with resource balancing. It is understood that an instance can be an object that accomplishes some form of work, wherein an instance can be implemented as, but is not limited to, an application, a software application, a virtual server, and the like. A host can be an item that enables one or more instances to operate or function, wherein a host can be implemented as, but is not limited to, a physical server, a computing device, a computer system, and the like. Understand that system 100 can consolidate spare capacity and/or resources into one or more overhead hosts (e.g., 110), rather than having them spread throughout a collection of physical server hosts (e.g., 104, 106 and 108), thus significantly reducing the overhead in system 100 in general.

For example, all existing instances (e.g., 112, 114, 116, 118, 120, 122, 124, 126, 128, 130, 132 and 134) can be placed onto normal physical server hosts (e.g., 104, 106 and 108) which can be fully utilized without concern for spare capacity and/or resources. When any given instance (e.g., 128) experiences unexpected resource requirements, a manager module 102 of system 100 can migrate the instance from its host (e.g., 106) to an overhead host (e.g., 110). Since the load of the overhead host 110 can be closely monitored by the manager module 102, the instance can be provided the additional capacity it desires. However, when the instance no longer needs the additional capacity, it can be moved back to a normal host (e.g., 104,106 or 108).

Specifically, system 100 of FIG. 1A includes a manager module 102 that can automatically monitor the performance, capabilities, and/or the available resources of a plurality of physical host servers, such as, but not limited to, physical host servers 104, 106 and 108 that each has a plurality of virtual servers operating thereon. When the manager module 102 automatically detects that one or more of the physical servers 104-108 are adversely operating beyond a predefined threshold level, the manager module 102 can automatically determine which virtual server or virtual servers are causing and/or associated with the physical server operating beyond the threshold level. Once the manager module 102 determines which virtual servers are adversely affecting the operation of the physical server, the manager module 102 can automatically and transparently move or migrate any of those virtual servers from its current host physical server to the overhead server 110 in order to operation thereon. It is noted that the overhead server 110 is specifically under-utilized thereby enabling it to handle those virtual servers that are currently requiring more server resources and/or capabilities. It is pointed out that the migration of any virtual server from its host server to the overhead server 110 can be invisible to that virtual server.

The manager module 102 can be coupled with host physical servers 104, 106 and 108. As such, the manager module 102 can monitor the performance, capabilities, and/or the available resources of physical host servers 104-108 as virtual servers operate on each of them. For example, virtual servers 112, 114, 116 and 118 are operating and/or resident on host physical server 104 while virtual servers 120, 122, 124, 126 and 128 are operating and/or resident on host physical server 106. Moreover, virtual servers 130, 132 and 134 are operating and/or resident on host physical server 108. Specifically, the manager module 102 can automatically monitor the host physical servers 104-108 in order to make sure each of them are able to handle the demands of the virtual servers operating on each of them.

For example, within FIG. 1A, assume that the monitor module 102 automatically detects an increased utilization of the resources and/or capabilities of host physical server 106. As such, the monitor module 102 can automatically determine which one or more of the virtual servers 120-128 operating thereon are causing the increased utilization of physical server 106. For instance, the virtual server 128 could be operating at a higher than normal volume of operation because it is involved with selling toys over the Internet (not shown) and the Christmas season is fast approaching. Once the manager module 102 automatically identifies (or determines) that the virtual server 128 is causing the increased utilization of physical server 106, the manager module 102 can automatically initiate and cause the move or migration of the virtual server 128 to the overhead physical server 110 as shown in FIG. 1B.

Figure 1B:
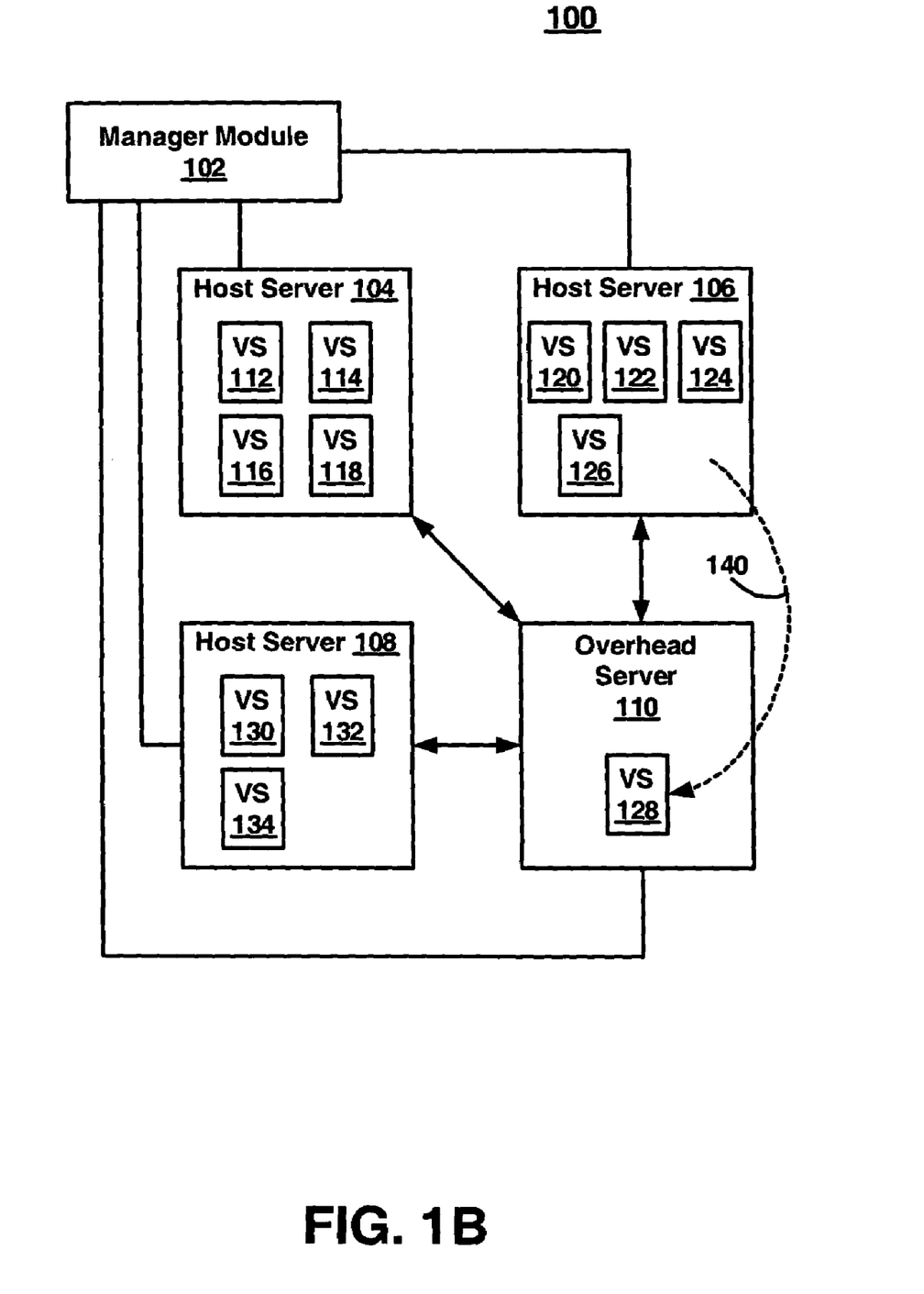
FIG. 1B is a block diagram showing exemplary movement of a virtual server in accordance with various embodiments of the invention.

FIG. 1B is a block diagram showing movement of virtual server 128 within system 100 in accordance with various embodiments of the invention. Specifically, dashed arrow 140 indicates the migration of virtual server 128 from its host physical server 106 to the overhead server 108 that can occur under the direction of the manager module 102. It is understood that there are a wide variety of ways that virtual server 128 can be moved or migrated by the manager module 102 from the physical server 106 to overhead server 110. For example, one or more software applications can be utilized by the manager module 102 to move or migrate virtual server 128 from physical server 106 to overhead server 110 such that virtual server 128 would be operating and/or resident thereon. In one embodiment in accordance with the invention, manager module 102 of system 100 can utilize VMware Virtual-Center and VMware VMotion technologies to migrate or move a virtual server (e.g., 128) from one physical server host (e.g., 106) to an extra capacity physical server (e.g., 110). However, any type of virtual server management application can be utilized within system 100 in order to move or migrate one or more virtual servers from one physical server host to an extra capacity physical server.

It is noted that manager module 102 can be coupled to the overhead server 110 thereby enabling module 102 to automatically monitor and determine when one or more virtual servers operating on capacity server 110 are operating beneath (or beyond) one or more functional thresholds. For example, referring to FIG. 1B, the manager module 102 can automatically monitor and determine when the virtual server 128 is operating near its normal activity level, which can be associated with a functional threshold. Note that the one or more functional thresholds can be associated with, but is not limited to, memory utilization, network utilization, central processing unit (CPU) utilization, disk drive utilization, and/or any combination thereof performed by virtual server 128 while operating on overhead server 110. It is further understood that a threshold usage level can be associated with, but is not limited to, memory utilization, network utilization, CPU utilization, disk drive utilization, and/or any combination thereof. If the manager module 102 determines that the virtual server 128 is operating beneath (or beyond) one or more thresholds while operating on extra capacity server 110, the manager module 102 can automatically initiate and cause the move or migration of the virtual server 128 to a physical server host, as shown in FIG. 1C.

Figure 1C:
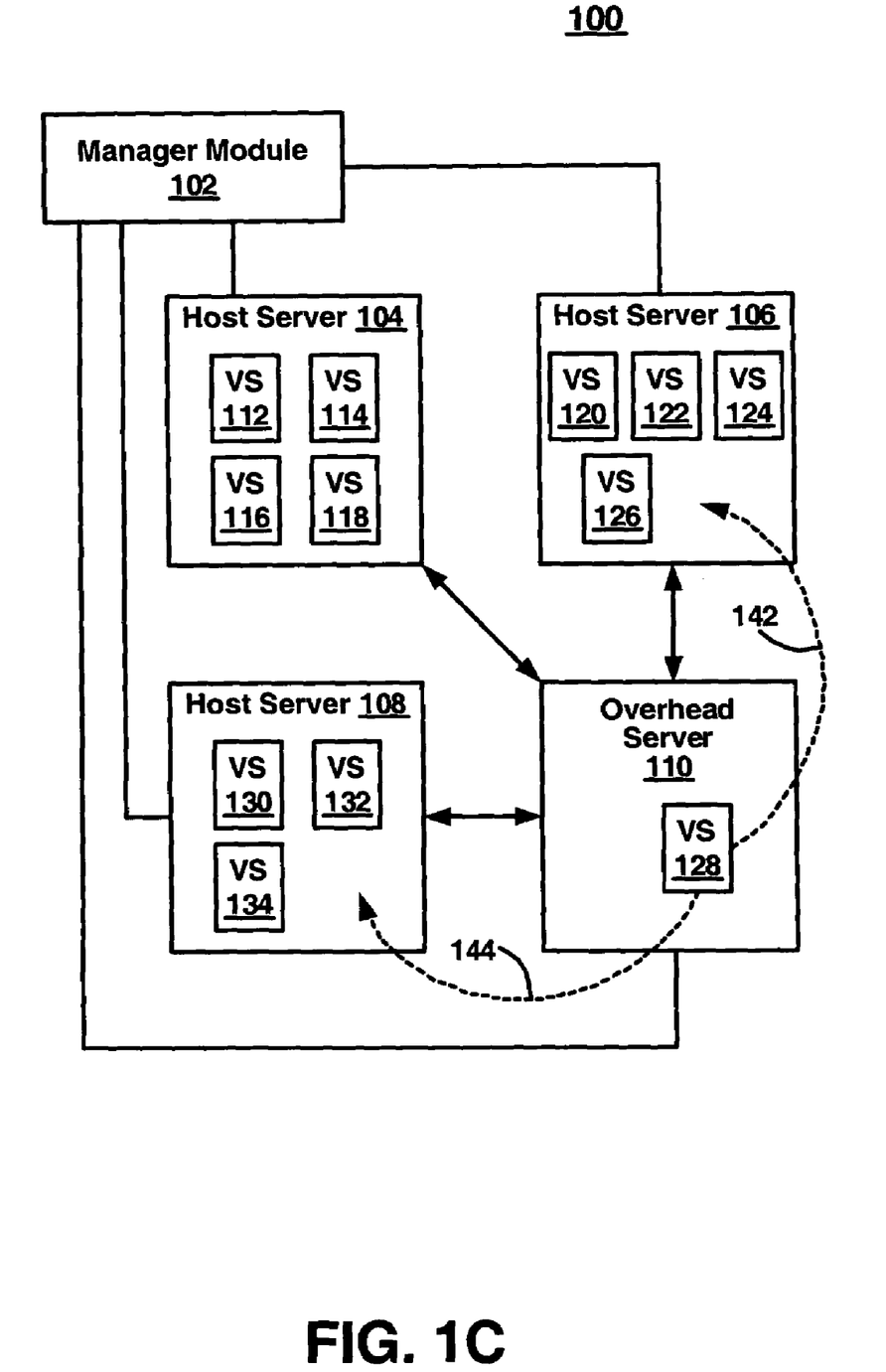
FIG. 1C is a block diagram showing additional exemplary movement of a virtual server in accordance with various embodiments of the invention.

FIG. 1C is a block diagram showing the automatically movement of virtual server 128 from the overhead server 110 to a physical server host in accordance with various embodiments of the invention. For example, dashed arrow 142 indicates the automatically migration of virtual server 128 from overhead server 110 back to the host physical server 106, which can occur under the direction of the manager module 102. Alternatively, instead of being moved or migrated back to physical server 106, dashed arrow 144 indicates the automatically migration of virtual server 128 from overhead server 110 to the host physical server 108, which can occur under the direction of the manager module 102. As such, manager module 102 can automatically initiate and cause the migration of virtual server 128 from extra capacity server 110 to any one of the physical servers 104-108 of system 100. Therefore, a virtual server (e.g., 128) does not have to be returned by the manager module 102 to the physical server (e.g., 106) that it was removed from originally. Note that there are a wide variety of ways that virtual server 128 can be moved or migrated from overhead server 110 to physical server 106. For example, the migration of virtual server 128 can be implemented in any manner similar to that described herein, but is not limited to such.

Within FIG. 1C, it is understood that as a protection against inappropriate vacillation of virtual servers (e.g., 128) from one host (e.g., 106) to another host (e.g., 110), the manager module 102 can ensure that performance aspects of the virtual server are consistent for a set (or predefined) period of time before any action is taken.

It is noted that system 100 of FIGS. 1A-1C can dramatically increase utilization of physical host servers (e.g., 104-108) and improve server performance while handling dynamic virtual server peak loads without negative impact to other virtual servers in the shared environment 100. Additionally, more virtual servers can be operating on each physical server host thereby resulting in increased host utilization. As such, there can be a decrease in administration costs since fewer host servers allow for a decrease in monthly support costs. Furthermore, there can be a reduced cost for future investments since fewer host servers are needed to handle virtual servers.

Capacity required for the growth of any given virtual server within system 100 is provided by a shared resource (e.g., overhead server 110); outside the scope of the original location the virtual server was hosted. Since this capacity is shared, it is available to a wide collection of host servers (e.g., 104-108), removing the problem of wasted or stranded capacity on each of those hosts. The aggregation of this overhead into one or more separate overhead hosts (e.g., 110) allows the overall overhead to shrink since it is used more effectively. This reduces the overall number of hosts that would typically exist to provide a similar level of capacity.

Furthermore, since it can almost be guaranteed that any given virtual server (or instance) will be provided the additional capacity it desires on an overhead host (e.g., 110) other than its original host, the original host may be fully utilized, thereby gaining a much higher average utilization rate. This results in lowering investment costs and increasing capacity.

Within system 100 of FIGS. 1A-1C, it is noted that the manager module 102 is self-optimizing. For example, it can be implemented to understand the maximum levels that any given physical server host can provide, and can place virtual servers (or instances) on each host up to the point where it reaches those maximums. When any of those virtual servers (or instances) needs additional capacity, they can be moved to the overhead host 110. When the virtual server (or instance) is no longer needing additional capacity, it can be moved back to a normal server host, though not necessarily to the original host that hosted the virtual server (or instance). Over time, each host can be utilized to the maximum extent it can support without human intervention.

It is appreciated that the manager module 102 of system 100 can automatically and dynamically provide additional capacity, as needed, to any given virtual server (or instance), by moving the virtual server (or instance) to the overhead server 110 rather than attempting to extract the needed capacity from that owned by existing virtual servers (or instances). This allows the virtual servers (or instances), regardless of where they are physically hosted, to be assured that the capacity they have at a minimum can always be available. The increased capacity needs of one virtual server (or instance) will not negatively impact the existing resources being used by any other virtual server (or instance) in the system 100.

One of the advantages associated with system 100 of FIGS. 1A-1C is that it can provide a higher return on the asset investment. For example, by removing the need to maintain overhead capacity on the majority of physical server hosts (e.g., 104-108) allows each host to be utilized more heavily, knowing that additional capacity needs can be shunted to one or more specific overhead host servers (e.g., 110). Moreover, the higher utilization of host assets can translate into the need to purchase fewer assets to achieve the same result as before, thereby lowering the original investment costs of a given system.

Another advantage associated with system 100 is that it can provide additional server capacity and/or resources. For example, the ability to fully load up any given physical server host, while simultaneously guaranteeing the availability of peak resource needs for any given virtual server (or instance), can translate into the generation of additional server capacity compared to a conventionally managed system.

Yet another advantage associated with system 100 of FIGS. 1A-1C is that it includes automated management. For example, there is no human intervention needed once the original parameters for a given system (e.g., 100) are defined, such as, maximum host capacity, minimum virtual server or instance requirements, hysteresis values (or thresholds) to eliminate oscillation between a physical server host and the overhead server 110, etc. Once these parameters are set, the manager module 102 and system 100 can be self-balancing.

Still another advantage associated with system 100 is its scalability. For example, system 100 can be scaled to whatever level is desired, as long as any given physical server host can migrate its virtual server (or instances) to any given overhead server (e.g., 110) or any other given host. It is noted that as long as a communication channel can exist, system 100 can be scaled up as much as desired.

Another advantage associated with system 100 of FIGS. 1A-1C is that it can be integrated into existing infrastructures that have the capability to be virtualized, or are already virtualized. For example, manager module 102 can begin by simply being pointed at existing physical server hosts that are to be identified as normal servers and other physical server hosts that are to be identified as overhead servers. Manager module 102 could then migrate any virtual server (or instance) on an overhead host (e.g., 110) to the normal hosts (e.g., 104-108) that were not experiencing the need for additional resources and/or capacity. Virtual servers (or instances) operating on the normal hosts could begin to be monitored for additional capacity needs and temporarily migrated to one or more overhead hosts as needed, as described herein, but not limited to such.

Yet another advantage associated with system 100 is that once one or more virtual servers (e.g., 128) are moved from their physical server host (e.g., 106) to an overhead server (e.g., 110), the resources and/or capacity previously used by them can now potentially be used (if needed) by other virtual servers (e.g., 120-126) remaining on the host.

Within FIGS. 1A-1C, system 100 can include the manager module 102, the host servers 104-108, and the overhead server 100. It is appreciated that the manager module 102 can be coupled to each of host servers 104-108 and can be coupled to overhead server 110. Note that system 100 can include a greater or fewer number of physical host servers than the shown host servers 104-108. Additionally, system 100 can include a greater number of overhead servers than the shown overhead server 110. Furthermore, it is understood that any number of virtual servers (or instances) can be resident and/or operating on each of the host servers 104-108. Also, it is appreciated that any number of virtual servers (or instances), including none, may be resident and/or operating on the overhead server 110.

Note that the overhead server 110 can be implemented in a wide variety of ways. For example in one embodiment, the overhead server 110 can have similar operational performance as the host servers 104-108. In another embodiment, the overhead server 110 can have better operational performance than the host servers 104-108. For instance, the overhead server 110 can be implemented with, but is not limited to, more volatile and/or non-volatile memory capacity, faster disk drive I/O, faster network I/O, faster CPU clock speed, more CPUs, and/or any combination thereof, when compared to host servers 104-108. In this manner, the performance of system 100 may be improved just by investing in one or more hardware upgrades for overhead server 110. In yet another embodiment, each of the host servers 104-108 can have better operational performance than the overhead server 110. For example, each of the host servers 104-108 can be implemented with, but is not limited to, more volatile and/or non-volatile memory capacity, faster disk drive I/O, faster network I/O, faster CPU clock speed, more CPUs, and/or any combination thereof, when compared to overhead server 110.

System 100 of FIGS. 1A-1C can also include a greater number of manager modules than the shown manager module 102. Furthermore, manager module 102 can be implemented with, but is not limited to, software, firmware, electronic hardware, or any combination thereof. Note that host servers 104-108 and overhead server 110 can each be implemented with, but is not limited to, a server computer system, a computing system, a computing device, a mainframe computer system, a portable computing device, a portable computer system, or the like. It is understood that system 100 may not include all of the elements shown in FIGS. 1A-1C. Additionally, system 100 can include one or more elements that are not shown in FIGS. 1A-1C.

Figure 2:
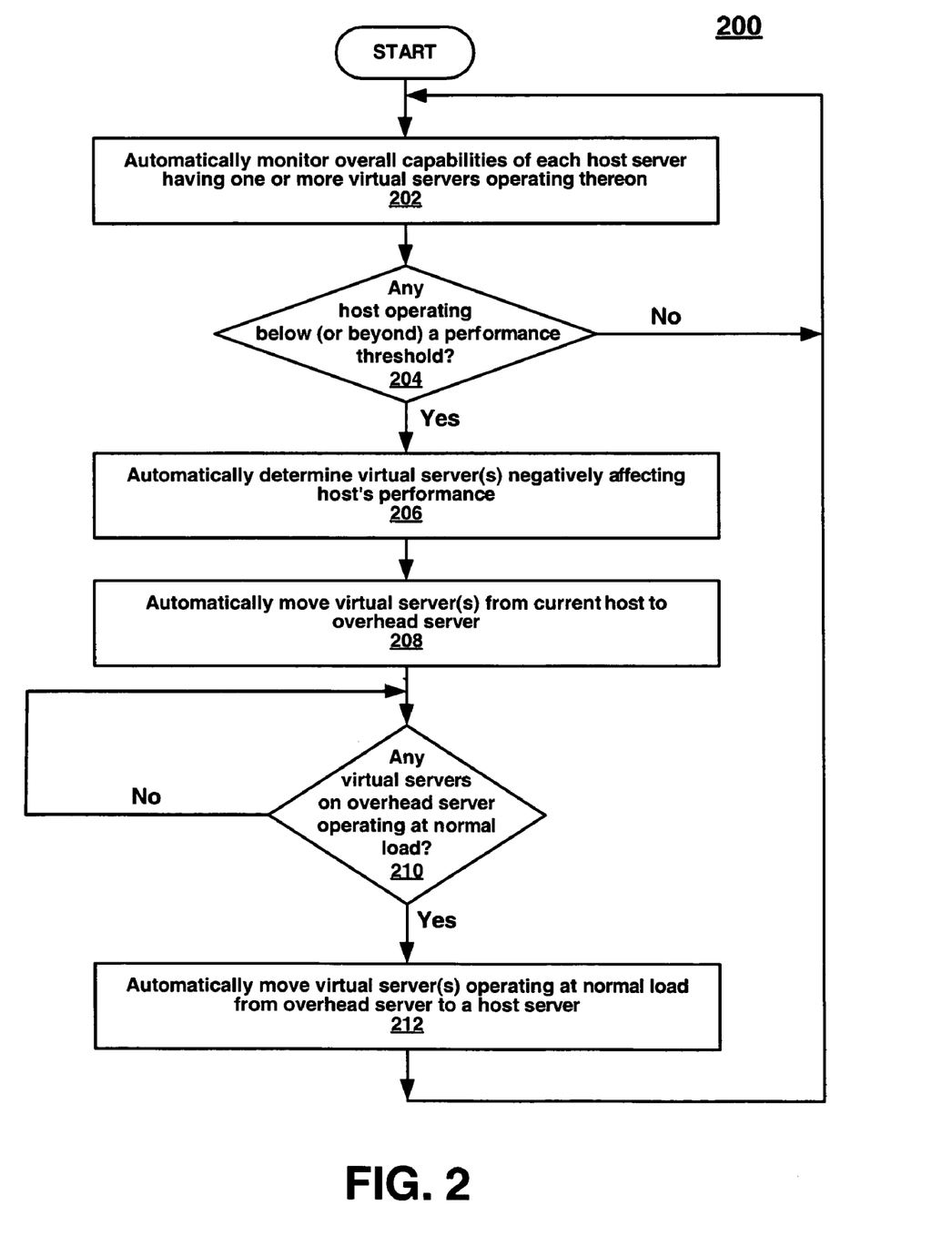
FIG. 2 is a flowchart of an exemplary method in accordance with various embodiments of the invention.

FIG. 2 is a flowchart of a method 200 for enabling dynamic performance management of virtual servers in accordance with various embodiments of the invention. Method 200 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 200, such operations are exemplary. That is, method 200 may not include all of the operations illustrated by FIG. 2. Also, method 200 may include various other operations and/or variations of the operations shown by FIG. 2. Likewise, the sequence of the operations of method 200 can be modified. It is noted that the operations of method 200 can be performed by software, by firmware, by electronic hardware, or by any combination thereof.

Specifically, method 200 can include automatically monitoring the overall capabilities of each host physical server having one or more virtual servers operating thereon. A determination can be automatically made to determine if any host physical server is operating below (or beyond) a performance threshold. If not, method 200 returns to continue to monitor the overall capabilities of each physical server host. However, if any host is operating below (or beyond) the performance threshold, an automatic determination can be made to determine which virtual server or virtual servers are negatively affecting the host's performance. Once the one or more virtual servers are determined or identified, each can automatically and transparently be moved or migrated from their current physical server host to an overhead or extra capacity server to operate thereon. A determination can be automatically made to determine if any virtual servers operating on the overhead server are operating at a "normal" or non-demanding or non-peak load. If not, this automatic determination can be repeated. However, if it is determined that one or more of the virtual servers are operating at a normal load, each virtual servers can automatically be moved or migrated from their current overhead server host to a host physical server to operate thereon. As such, once each virtual server has returned to a less capacity demanding operation or non-peak load, it can be moved from the extra capacity server to a host physical server.

At operation 202 of FIG. 2, the overall capabilities and/or resources of each host physical server (e.g., 106) having one or more virtual servers (e.g., 120-128) operating thereon can be automatically monitored. For example in one embodiment, a manager module (e.g., 102) can automatically monitor at operation 202 the overall capabilities and/or resources of each host physical server having one or more virtual servers operating thereon. Understand that the overall capabilities and/or resources of each host physical server can include, but is not limited to, memory utilization, network utilization, CPU utilization, disk drive utilization, and/or any combination thereof associated with one or more virtual servers operating on the host physical server. It is noted that operation 202 can be implemented in a wide variety of ways. For example, operation 202 can be implemented in any manner similar to that described herein, but is not limited to such.

At operation 204, a determination can be automatically made to determine if any host physical server is operating below (or beyond) a performance threshold. If not, method 200 can proceed to the beginning of operation 202 to continue automatically monitoring the overall capabilities of each physical server host. However, if it is determined at operation 204 that any host is operating below (or beyond) the performance threshold, methods 200 proceeds to operation 206. Understand that the performance threshold can be related to (or associated with), but is not limited to, memory utilization, network utilization, CPU utilization, disk drive utilization, and/or any combination thereof associated with one or more virtual servers operating on the host physical server. It is understood that operation 204 can be implemented in a wide variety of ways. For example, operation 204 can be implemented in any manner similar to that described herein, but is not limited to such.

At operation 206 of FIG. 2, an automatic determination can be made to determine which virtual server or virtual servers (e.g., 120-128) are negatively affecting the host's performance. For example in one embodiment, a manager module (e.g., 102) can automatically determine at operation 206 which virtual server or virtual servers are negatively affecting the host's performance. It is appreciated that operation 206 can be implemented in a wide variety of ways. For example, operation 206 can be implemented in any manner similar to that described herein, but is not limited to such.

At operation 208, each determined or identified virtual server (e.g., 128) can automatically and transparently be moved or migrated from its current physical server host (e.g., 106) to an overhead or extra capacity server (e.g., 110) to operate thereon. For example, a manager module (e.g., 102) can automatically move each virtual server from its current physical server host to an overhead server. It is noted that operation 208 can be implemented in a wide variety of ways. For example, operation 208 can be implemented in any manner similar to that described herein, but is not limited to such.

At operation 210 of FIG. 2, a determination can be automatically made to determine if any virtual servers (e.g., 128) operating on the overhead server (e.g., 110) are operating at a "normal" or non-demanding or non-peak load. If not, process 200 can proceed to the beginning of operation 210 to repeat that operation. However, if it is determined at operation 210 that one or more of the virtual servers are operating at a normal or under-demanding or non-peak load, process 200 can proceeds to operation 212. It is noted that the normal load or non-demanding load or non-peak load can be related to memory utilization, network utilization, CPU utilization, disk drive utilization, and/or any combination thereof associated with one or more virtual servers operating on the overhead server. It is understood that operation 210 can be implemented in a wide variety of ways. For example, operation 210 can be implemented in any manner similar to that described herein, but is not limited to such.

At operation 212, each virtual server (e.g., 128) operating at a normal or non-demanding or non-peak load can automatically be moved or migrated from the current overhead server host to a host physical server (e.g., 104, 106 or 108) to operate thereon. Note that the each virtual server can be moved at operation 212 to any host physical server. As such, each virtual server may not be moved to the host physical server that it was originally removed from. It is appreciated that operation 212 can be implemented in a wide variety of ways. For example, operation 212 can be implemented in any manner similar to that described herein, but is not limited to such. At the completion of operation 212, process 200 can proceed to the beginning of operation 202.

Figure 3:
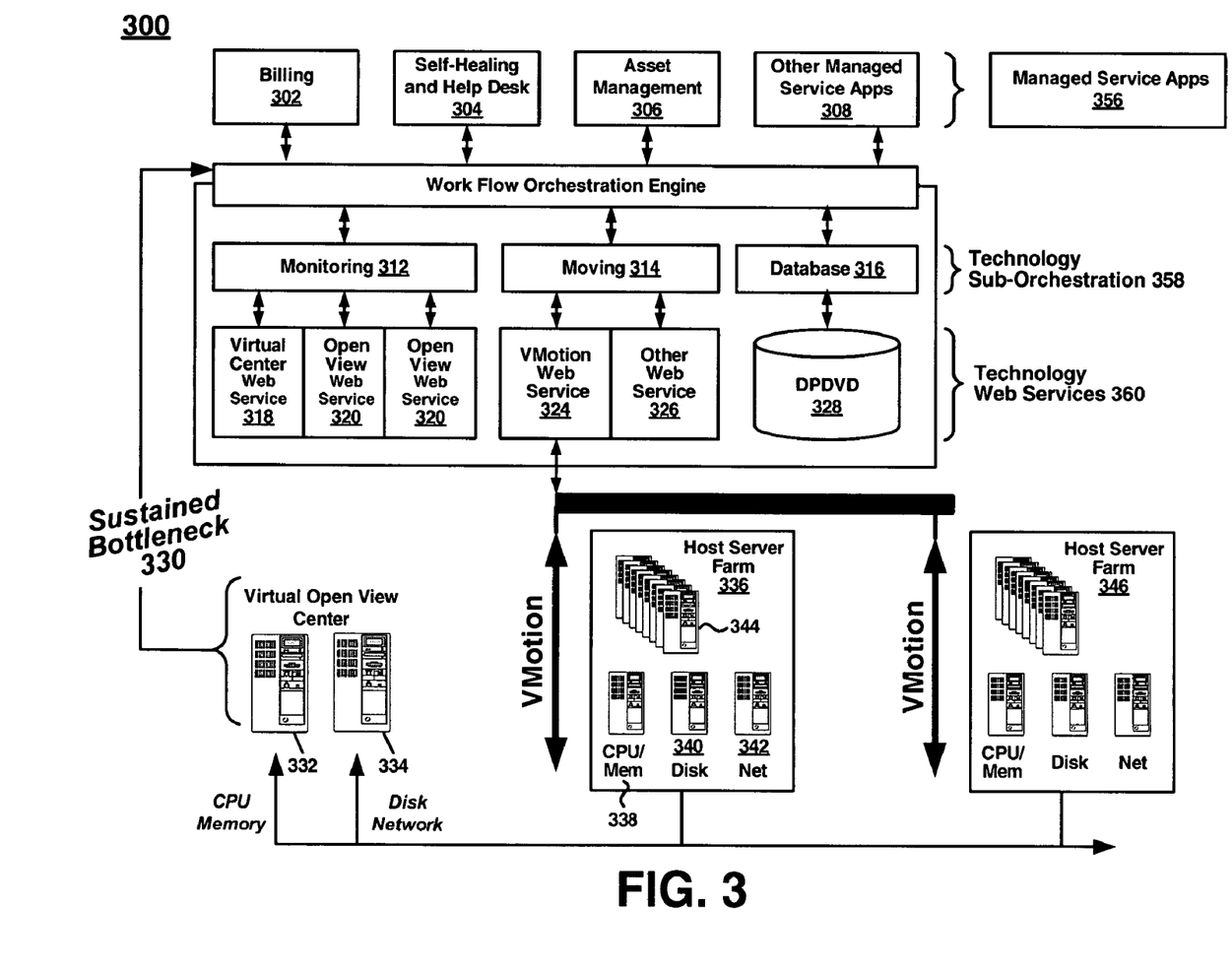
FIG. 3 is a block diagram of another exemplary system in accordance with various embodiments of the invention.

FIG. 3 is a block diagram of a dynamic performance management system 300 in accordance with various embodiments of the invention. System 300 can include an infrastructure of overhead or extra capacity host servers (e.g., 338, 340, 342, 348, 350 and 352) such that a small number can be physically tuned to reduce the impact of one of four areas of common server bottlenecks, while the rest of the physical server hosts (e.g., 344 and 354) can be configured for normal usage. In addition, system 300 can include a management layer that can dynamically monitor the resource needs of any given virtual server (not shown) and can migrate virtual servers (not shown) experiencing resource pressure to overhead or extra capacity hosts (e.g., 338-342 and 348-352) that are tuned to eliminate that pressure. Note that the virtual servers of system 300 can each be moved or migrated in any manner similar to that described herein, but is not limited to such.

Since system 300 provides a favorable solution for handling virtual servers that need additional capacity, it is possible to dramatically raise the minimum level of operation or utilization of any given normal host server (e.g., one of servers 344 and 354). Within system 300, when a virtual server operating on a normal physical host (e.g., one of hosts 344) needs significant additional capacity, it can be moved or migrated to a completely different overhead host (e.g., 338, 340 or 342) that is tuned specifically to meet the current needs of the virtual server. Note that the virtual servers can be migrated from host to host without concern or impact to the applications running within the virtual server. In addition, a characteristic of virtual servers in general is that the hardware layer is abstracted and presented to the outside world as though it is a physical server. This means that the virtual server's external characteristics (e.g., IP (Internet Protocol) address, MAC (Media Access Control) address, and server name) are the same regardless of the physical host upon which it resides.

Within system 300 of FIG. 3, a VMotion web service 324 can be utilized to migrate virtual servers from one host to another host. Within one embodiment, the migration employed by VMotion 324 can occur in, but is not limited to, three stages. For example, in the first stage, a VirtualCenter web service 318 can automatically verify that the existing virtual server is in a stable state within its current host (e.g., one of hosts 354). In the second stage, the virtual server state information (e.g., memory, registers, and network connections) can be automatically copied to the target overhead or extra capacity host (e.g., 348, 350 or 352). In the third stage, prior to the final transfer of control, the virtual server's current memory state can be automatically swapped from its current host (e.g., one of hosts 354) to the overhead host (e.g., 348, 350 or 352) and then it is automatically set running on the overhead host. It is noted that in one embodiment, there can be a moment of "glitch" time that exists when the final transition occurs between the hosts. However, this "glitch" time can be limited to milliseconds (ms), e.g., about 25 ms.

Within system 300, in one embodiment, the infrastructure portion of it focuses on physically configuring a small number of overhead servers for higher performance or additional capacity in network resources, disk resources, CPU resources, random access memory (RAM) resources, and/or any combination thereof. For example, a host server farm 336 can include a CPU/memory (CPU/Mem) overhead server 338, a disk (Disk) overhead server 340, and a network (Net) overhead server 342. Furthermore, a host server farm 346 can include a CPU/memory overhead server 348, a disk overhead server 350, and a network overhead server 352. It is understood that each of the overhead servers 338-342 and 348-352 can be implemented in a wide variety of ways.

For example, within FIG. 3, the extra capacity network servers 342 and 352 can each be implemented with, but not limited to, gigabyte (GB) network interface cards (NICs) instead of 10/100 NICs, with no sharing of network ports among virtual servers. In this manner, this can provide the potential for the same number of virtual servers on an overhead host at any given time as the number of network ports that can exist on an exemplary overhead server.

Furthermore, the extra capacity disk servers 340 and 350 can each be implemented with, but not limited to, two gigabit connections instead of one gigabit connection, with no sharing of ports among virtual servers. In this fashion, this can provide the potential for the same number of virtual servers on an overhead host at any given time as the number of fiber ports that can exist on an exemplary overhead server.

Additionally, within FIG. 3, the extra capacity CPU/memory servers 338 and 348 can each be implemented with, but not limited to, increased overhead host memory to 64 GB of random access memory (RAM), with 4 GB per virtual server and no CPU sharing among virtual servers. In this manner, this can provide the potential for, but not limited to, 7 to 15 virtual servers on each overhead host at any given time. For example, this range can exist because CPU-blocked virtual servers can be assigned a dedicated CPU, limiting the maximum to 7 virtual servers. However, memory-blocked virtual servers can be assigned a full 4 GB of memory space, allowing up to 15 per overhead host, and will not be assigned a dedicated CPU.

It is appreciated that a benefit of assigning fewer virtual servers to the network overhead servers 342 and 352 along with disk overhead servers 340 and 350 is that each virtual server on those overhead hosts can have a much higher level of access to memory and the CPU. As such, this can resolve issues that may exist when there is a combination of bottlenecks to resolve (e.g. network and CPU pressure, disk and memory pressure). System 300 can inherently deal with these types of combination bottlenecks.

Within system 300 of FIG. 3, in one embodiment, a software component can monitor and move the virtual servers from host to host depending on the dynamic needs of each virtual server. Once a collection of overhead host servers (e.g., 338, 340 and 342) has been configured as described herein, software (e.g., scripts) in accordance with various embodiments of the invention can be installed on the VirtualCenter console 332 and Hewlett-Packard (HP) OpenView Operations management console 334 that have visibility to all the virtual server hosts (e.g., server farms 336 and/or 346). At a very high level, software (e.g., manager module 102, which can include scripts) in accordance with various embodiments of the invention can perform a collection of functions. For example, in one embodiment, the software can monitor the performance of running virtual servers on the managed server hosts (e.g., 344 and 354) for indications that they are experiencing pressure in one of the four bottleneck categories described (e.g., network, disk, CPU, and/or memory).

Additionally, in one embodiment, when a throughput threshold is breached, the software can identify the physical resource that is being blocked, and then migrate the virtual server to the appropriately overhead host (e.g., 338, 340, 342, 348, 350 or 352). Moreover, in one embodiment, when a virtual server is operating or resident on an overhead server, it can be monitored for a normal or non-peak load state. When this occurs, the virtual server can be migrated back to a normally configured server host (e.g., one of server hosts 344 or 354). It is understood that as a protection against inappropriate vacillation of virtual servers from host to host, the software in accordance with an embodiment can ensure that performance aspects of the virtual server are consistent for a set or predefined period of time before any action is taken. Additionally, when multiple roadblocks are identified, the software in accordance with an embodiment can manage priorities to ensure that the highest need is resolved. It is appreciated that software scripts in accordance with various embodiment of the invention can be created using, but is not limited to, the VMware VirtualCenter SDK (software development kit) and HP OpenView APIs (application program interfaces) to control the virtual servers and their hosts.

Within FIG. 3, the orchestration of system 300 can be triggered by a monitoring and alarming system. For example, the monitoring and alarming can be done by both VMware Virtual Center 332 and HP OpenView 334 using specific metrics monitored within Virtual Center 332 (e.g., CPU and Memory) and with HP OpenView 334 (e.g., Network and Disk). Note that as additional tools become available, or a need exists to use other existing tools, web services can be written that allow them to be plugged into the orchestration process.

System 300 can include managed services applications (Apps) 356 that can include, but is not limited to, a billing module 302, a self-healing and help desk module 304, an asset management module 306, along with other managed server applications 308. System 300 can include a workflow orchestration engine 310 that can be coupled with modules 302-308. Additionally, system 300 can include technology sub-orchestration 358 that can include, but is not limited to, a monitoring module 312, a moving module 314 and a database module 316, which can each be coupled to the workflow orchestration engine 310. The system 300 can also include technology web services 360 that can include, but is not limited to, a VirtualCenter web service 318, a HP OpenView web service 320, and other web services 322, which can be coupled to the monitoring module 312. The technology web services 360 can also include, but is not limited to, a VMotion web service 324 and other web service 326, which can be coupled to the moving module 314. The technology web services 360 that can also include, but is not limited to, a Dynamic Performance Management database (DPMDB) 328 that can be coupled to the database module 316. Note that the Dynamic Performance Management database 328 can include a collection of data specific to the overall dynamic performance management system 300.

Within FIG. 3, system 300 can include host server farms 336 and 346, which can be coupled to the VMotion web service 324. In this manner, the VMotion web service 324 can move or migrate virtual servers from host to host within server farms 336 and 346. Note that server farm 336 can include one or more physical server hosts 344 along with overhead servers 338-342. Even though it is not shown, understand that the one or more physical server hosts 344 can be coupled to overhead servers 338-342. In accordance with various embodiments of the invention, server farm 336 can include, but is not limited to, one or more CPU/memory overhead servers 338, one or more disk overhead servers 340, one or more network overhead servers 342, and/or any combination thereof.

It is appreciated that server farm 346 can include one or more physical server hosts 354 along with overhead servers 348-352. Even though it is not shown, understand that the one or more physical server hosts 354 can be coupled to overhead servers 348-352. In accordance with various embodiments of the invention, server farm 346 can include, but is not limited to, one or more CPU/memory overhead servers 348, one or more disk overhead servers 350, one or more network overhead servers 352, and/or any combination thereof. The VirtualCenter 332 and HP OpenView 334 can be coupled to server farms 336 and 346 in order to monitor the virtual servers operating on host servers 344 and 354 along with overhead servers 338-342 and 348-352. It is understood that VirtualCenter 332 and HP OpenView 334 can be coupled with the workflow orchestration engine 310 in order to communicate sustained bottlenecks 330 associated with virtual servers operating within server farms 336 and 346.

It is understood that system 300 may not include all of the elements shown in FIG. 3. Additionally, system 300 can include one or more elements that are not shown in FIG. 3.

Figure 4:
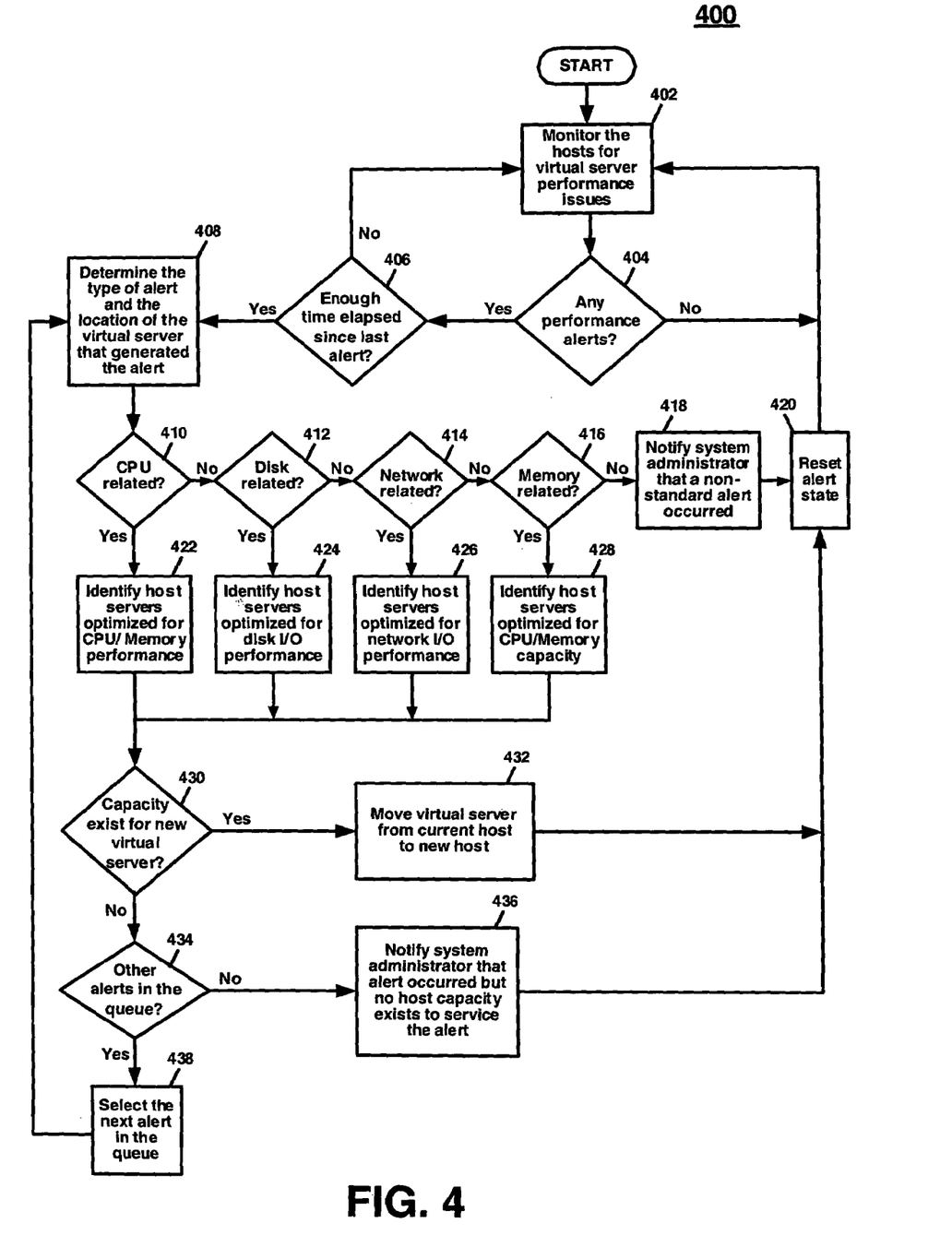
FIG. 4 is a flowchart of another exemplary method in accordance with various embodiments of the invention.

FIG. 4 is a flowchart of a method 400 for enabling dynamic performance management of virtual servers in accordance with various embodiments of the invention. Method 400 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 400, such operations are exemplary. That is, method 400 may not include all of the operations illustrated by FIG. 4. Also, method 400 may include various other operations and/or variations of the operations shown by FIG. 4. Likewise, the sequence of the operations of method 400 can be modified. It is noted that the operations of method 400 can be performed by software, by firmware, by electronic hardware, or by any combination thereof.

Specifically, method 400 can include automatically monitoring one or more physical server hosts for virtual server performance issues. A determination can be automatically made to determine if any performance alerts have been received from a virtual server operating on one of the physical server hosts. If not, method 400 can return to monitor the physical server hosts for virtual server performance issues. However, if it is determined that a performance alert has been received from a virtual server, a determination can be automatically made to determine if enough time has elapsed since the last alert was received from the same virtual server. If not, method 400 can return to monitor the physical server hosts for virtual server performance issues. However, if enough time has elapsed since the last alert from the same virtual server, it can be automatically determined what type of alert was received and the location of the virtual server that generated the alert.

Method 400 of FIG. 4 can automatically determined if the received alert is CPU related. If so, the one or more overhead host servers can be automatically identified that are optimized for CPU/memory performance. However, if the received alert is not CPU related, it can be automatically determined if the received alert is disk drive related. If so, the one or more overhead host servers can be automatically identified that are optimized for disk drive input and output (I/O) performance. However, if the received alert is not disk drive related, it can be automatically determined if the received alert is network related. If so, the one or more overhead host servers can be automatically identified that are optimized for network I/O performance. However, if the received alert is not network related, it can be automatically determined if the received alert is memory related. If so, the one or more overhead host servers can be automatically identified that are optimized for CPU/memory capacity. However, if the received alert is not memory related, a system administrator can be notified that a non-standard alert occurred. The alert state can then be reset and then method 400 can return to monitor the physical server hosts for virtual server performance issues.

Within method 400, a determination can be automatically made to determine if capacity exists on an overhead server for the new virtual server that generated the alert. If so, the virtual server can be automatically moved or migrated from its current physical server host to a new overhead server host. The alert state can then be reset and then method 400 can return to monitor the physical server hosts for virtual server performance issues. However, if there is no capacity that exists on an overhead server for the new virtual server that generated the alert, it can be automatically determined if there are one or more other alerts in a reception queue. If not, a system administrator can be automatically notified that an alert occurred but no overhead host capacity exists to service the alert. The alert state can then be reset and then method 400 can return to monitor the physical server hosts for virtual server performance issues. However, if there are one or more other alerts in the reception queue, the next alert in the reception queue can be automatically selected. Method 400 can then return to automatically determine what type of alert was received and the location of the virtual server that generated that alert.

At operation 402 of FIG. 4, one or more physical server hosts (e.g., 344 and 354) can be automatically monitored for virtual server performance issues. It is appreciated that operation 402 can be implemented in a wide variety of ways. For example, operation 402 can be implemented in any manner similar to that described herein, but is not limited to such.

At operation 404, it can be automatically determined if any performance alerts have been received from a virtual server operating on one of the physical server hosts (e.g., 344 and 354). If not, method 400 can return to operation 402. However, if it is determined at operation 404 that a performance alert has been received from a virtual server, process 400 can proceed to operation 406. It is understood that operation 404 can be implemented in a wide variety of ways. For example, operation 404 can be implemented in any manner similar to that described herein, but is not limited to such.

At operation 406 of FIG. 4, it can be automatically determined if enough (or a set) time has elapsed since the last alert was received from the same virtual server. If not, process 400 can proceed to operation 402. However, if it is determined at operation 406 that enough (or a set) time has elapsed since the last alert was received from the same virtual server, method 400 can proceed to operation 408. It is noted that operation 406 can be implemented in a wide variety of ways. For example, operation 406 can be implemented in any manner similar to that described herein, but is not limited to such.

At operation 408, it can be automatically determined what type of alert was received and the location of the virtual server that generated the alert. It is appreciated that operation 408 can be implemented in a wide variety of ways. For example, operation 408 can be implemented in any manner similar to that described herein, but is not limited to such.

At operation 410 of FIG. 4, it can be automatically determined if the received alert is CPU related. If not, process 400 can proceed to operation 412. However, if it is determined at operation 410 that the received alert is CPU related, process 400 can proceed to operation 422. It is understood that operation 410 can be implemented in a wide variety of ways. For example, operation 410 can be implemented in any manner similar to that described herein, but is not limited to such.

At operation 412, it can be automatically determined if the received alert is disk drive related. If not, process 400 can proceed to operation 414. However, if it is determined at operation 412 that the received alert is disk drive related, process 400 can proceed to operation 424. It is noted that operation 412 can be implemented in a wide variety of ways. For example, operation 412 can be implemented in any manner similar to that described herein, but is not limited to such.

At operation 414 of FIG. 4, it can be automatically determined if the received alert is network related. If not, process 400 can proceed to operation 416. However, if it is determined at operation 414 that the received alert is network related, process 400 can proceed to operation 426. It is appreciated that operation 414 can be implemented in a wide variety of ways. For example, operation 414 can be implemented in any manner similar to that described herein, but is not limited to such.

At operation 416, it can be automatically determined if the received alert is memory related. If not, process 400 can proceed to operation 418. However, if it is determined at operation 416 that the received alert is memory related, process 400 can proceed to operation 428. It is understood that operation 416 can be implemented in a wide variety of ways. For example, operation 416 can be implemented in any manner similar to that described herein, but is not limited to such.

At operation 418 of FIG. 4, a system administrator can be automatically notified that a non-standard alert occurred. Note that operation 418 can be implemented in a wide variety of ways. For example, operation 418 can be implemented in any manner similar to that described herein, but is not limited to such.

At operation 420, an alert state can then be automatically reset. Upon completion of operation 420, process 400 can proceed to operation 402. It is appreciated that operation 420 can be implemented in a wide variety of ways. For example, operation 420 can be implemented in any manner similar to that described herein, but is not limited to such.

At operation 422 of FIG. 4, one or more overhead host servers (e.g., 338 and/or 348) can be automatically identified that are optimized for CPU/memory performance. Understand that operation 422 can be implemented in a wide variety of ways. For example, operation 422 can be implemented in any manner similar to that described herein, but is not limited to such.

At operation 424, one or more overhead host servers (e.g., 340 and/or 350) can be automatically identified that are optimized for disk drive input and output (I/O) performance. It is noted that operation 424 can be implemented in a wide variety of ways. For example, operation 424 can be implemented in any manner similar to that described herein, but is not limited to such.

At operation 426 of FIG. 4, one or more overhead host servers (e.g., 342 and/or 352) can be automatically identified that are optimized for network I/O performance. Appreciate that operation 426 can be implemented in a wide variety of ways. For example, operation 426 can be implemented in any manner similar to that described herein, but is not limited to such.

At operation 428, one or more overhead host servers (e.g., 338 and/or 348) can be automatically identified that are optimized for CPU/memory capacity. It is understood that operation 428 can be implemented in a wide variety of ways. For example, operation 428 can be implemented in any manner similar to that described herein, but is not limited to such.

At operation 430 of FIG. 4, it can be automatically determined if capacity exists on an overhead server (e.g., 338, 340, 342, 348, 350 or 352) for the new virtual server that generated the alert. If not, process 400 can proceed to operation 434. However, if capacity exists on an overhead server for the new virtual server that generated the alert, process 400 can proceed to operation 432. It is noted that operation 430 can be implemented in a wide variety of ways. For example, operation 430 can be implemented in any manner similar to that described herein, but is not limited to such.

At operation 432, the virtual server can be automatically moved or migrated from its current physical server host to a new overhead server host (e.g., 338, 340, 342, 348, 350 or 352). Upon completion of operation 432, process 400 can proceed to operation 420. It is appreciated that operation 432 can be implemented in a wide variety of ways. For example, operation 432 can be implemented in any manner similar to that described herein, but is not limited to such.

At operation 434 of FIG. 4, it can be automatically determined if there are one or more other alerts in a reception queue. If so, process 400 can proceed to operation 438. However, if there are no other alerts in the reception queue, process 400 can proceed to operation 436. Understand that operation 434 can be implemented in a wide variety of ways. For example, operation 434 can be implemented in any manner similar to that described herein, but is not limited to such.

At operation 436, a system administrator can be automatically notified that an alert occurred but no overhead host capacity exists to service the alert. Upon completion of operation 436, process 400 can proceed to operation 420. Note that operation 436 can be implemented in a wide variety of ways. For example, operation 436 can be implemented in any manner similar to that described herein, but is not limited to such.

At operation 438 of FIG. 4, the next alert in the reception queue can be automatically selected. Upon completion of operation 438, process 400 can proceed to operation 408. It is appreciated that operation 438 can be implemented in a wide variety of ways. For example, operation 438 can be implemented in any manner similar to that described herein, but is not limited to such.

Figure 5:
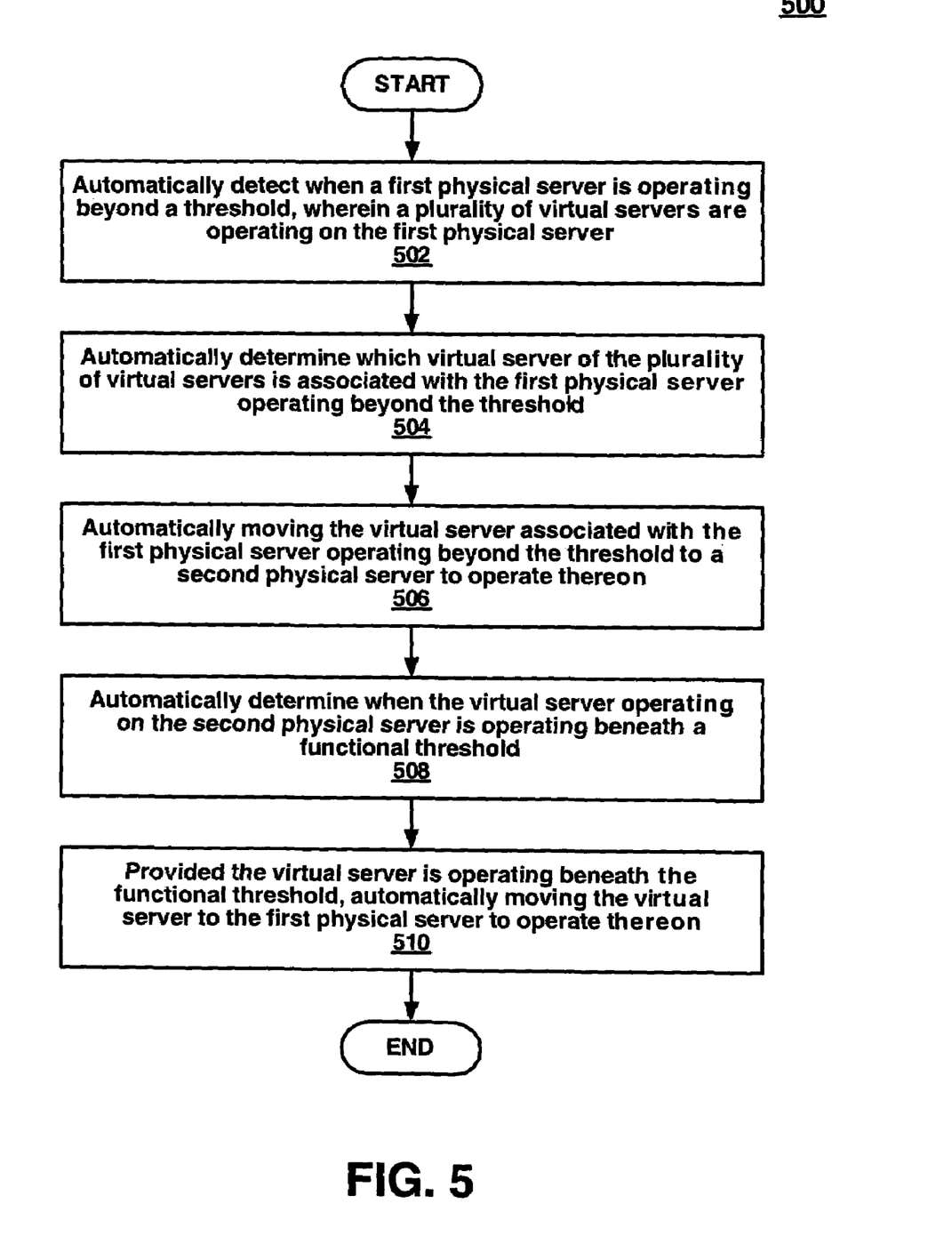
FIG. 5 is a flowchart of yet another exemplary method in accordance with various embodiments of the invention.

FIG. 5 is a flowchart of a method 500 for enabling dynamic performance management for virtual servers in accordance with various embodiments of the invention. Method 500 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 500, such operations are exemplary. That is, method 500 may not include all of the operations illustrated by FIG. 5. Also, method 500 may include various other operations and/or variations of the operations shown by FIG. 5. Likewise, the sequence of the operations of method 500 can be modified. It is noted that the operations of method 500 can be performed by software, by firmware, by electronic hardware, or by any combination thereof.

Specifically, method 500 can include automatically detecting when a first physical server is operating beyond a threshold. It is noted that a plurality of virtual servers are operating on the first physical server. Additionally, it can be automatically determined which virtual server of the plurality of virtual servers is associated with the first physical server operating beyond the threshold. The virtual server associated with the first physical server that is operating beyond the threshold can be automatically moved to a second physical server to operate thereon. It can be automatically determined when the virtual server operating on the second physical server is operating beneath a functional threshold. Provided the virtual server is operating beneath the functional threshold, the virtual server can be automatically moved to the first physical server to operate thereon.

At operation 502 of FIG. 5, it can be automatically detected when a first physical server is operating beyond a threshold. Understand that that a plurality of virtual servers can be operating and/or resident on the first physical server. It is appreciated that operation 502 can be implemented in a wide variety of ways. For example, operation 502 can be implemented in any manner similar to that described herein, but is not limited to such.

At operation 504, it can be automatically determined which virtual server of the plurality of virtual servers is associated with the first physical server operating beyond the threshold. It is noted that operation 504 can be implemented in a wide variety of ways. For example, operation 504 can be implemented in any manner similar to that described herein, but is not limited to such.

At operation 506 of FIG. 5, the virtual server associated with the first physical server operating beyond the threshold can be automatically (and transparently) moved to a second physical server to operate thereon. It is understood that operation 506 can be implemented in a wide variety of ways. For example, operation 506 can be implemented in any manner similar to that described herein, but is not limited to such.

At operation 508, it can be automatically determined when the virtual server operating on the second physical server is operating beneath (or beyond) a functional threshold. It is appreciated that operation 508 can be implemented in a wide variety of ways. For example, operation 508 can be implemented in any manner similar to that described herein, but is not limited to such.

At operation 510 of FIG. 5, provided the virtual server is operating beneath (or beyond) the functional threshold, the virtual server can be automatically moved to the first physical server to operate thereon. It is noted that operation 510 can be implemented in a wide variety of ways. For example, operation 510 can be implemented in any manner similar to that described herein, but is not limited to such. At the completion of operation 510, process 500 can be exited.

Note that system 100 of FIGS. 1A-1C, method 200 of FIG. 2, system 300 of FIG. 3, method 400 of FIG. 4, and method 500 of FIG. 5 are not limited to just operate with (or involve) one or more virtual servers. For example, in accordance with various embodiments, system 100, method 200, system 300, method 400 and method 500 can each operate with (or involve) one or more instances, as defined herein, but not limited to such. Additionally, in accordance with various embodiments, system 100, method 200, system 300, method 400 and method 500 can each operate with (or involve) one or more virtual servers in combination with one or more instances, as defined herein, but not limited to such.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A method for enabling dynamic performance management for virtual servers comprising the following computer-implemented steps:

detecting automatically when a first physical server is operating beyond a threshold, wherein a plurality of virtual servers are operating on said first physical server;

determining automatically a virtual server of said plurality of virtual servers which is associated with said first physical server and is operating beyond said threshold;

moving automatically and transparently said virtual server associated with said first physical server operating beyond said threshold to a second physical server to operate thereon;

determining automatically when said virtual server operating on said second physical server is operating beneath a functional threshold;

moving automatically and transparently said virtual server that is operating beneath said functional threshold to said first physical server to operate thereon; and verifying automatically that said virtual server is in a stable state within said first physical server before said moving, wherein said first physical server is configured to maximally utilize its resources for virtual servers operating below said threshold, and wherein said second physical server is configured to under-utilize its resources to provide capacity for operating said virtual server when said virtual server is operating beyond said threshold.

2. The method as recited in claim 1, wherein said threshold comprises network utilization.

3. The method as recited in claim 1, wherein said threshold comprises disk drive utilization.

4. The method as recited in claim 1, wherein said threshold comprises memory utilization.

5. The method as recited in claim 1, wherein said threshold comprises processor utilization.

6. A computer readable storage medium having computer readable code stored thereon for causing a computing device to perform a method for enabling dynamic performance management for virtual servers comprising:

detecting automatically when a first physical server is operating beyond a threshold, wherein a plurality of virtual servers are operating on said first physical server;

determining automatically a virtual server of said plurality of virtual servers which is associated with said first physical server and is operating beyond said threshold;

moving automatically and transparently said virtual server associated with said first physical server operating beyond said threshold to a second physical server to operate thereon;

determining automatically when said virtual server operating on said second physical server is operating beneath a functional threshold;

moving automatically and transparently said virtual server that is operating beneath said functional threshold to said first physical server to operate thereon; and verifying automatically that said virtual server is in a stable state within said first physical server before said moving, wherein said first physical server is configured to maximally utilize its resources for virtual servers operating below said threshold, and wherein said second physical server is configured to under-utilize its resources to provide capacity for operating said virtual server when said virtual server is operating beyond said threshold.

7. The computer readable storage medium of claim 6, wherein said threshold comprises network utilization.

8. The computer readable storage medium of claim 6, wherein said threshold comprises memory utilization.

9. The computer readable storage medium of claim 6, wherein said threshold comprises processor utilization.

10. A method for enabling dynamic performance management for virtual servers comprising the following computer-implemented steps:

receiving a performance alert from a virtual server operating on a first physical server, wherein a plurality of virtual servers are operating on said first physical server;

determining automatically location of said virtual server;

determining automatically what issue said performance alert is related to;

identifying automatically a second physical server optimized for said issue;

moving automatically and transparently said virtual server from said first physical server to said second physical server to operate thereon;

determining automatically when said virtual server operating on said second physical server is operating beneath a functional threshold;

moving automatically and transparently said virtual server that is operating beneath said functional threshold to said first physical server to operate thereon; and verifying automatically that said virtual server is in a stable state within said first physical server before said moving, wherein said first physical server is configured to maximally utilize its resources for virtual servers operating below said threshold, and wherein said second physical server is configured to under-utilize its resources to provide capacity for operating said virtual server when said virtual server is operating beyond said threshold.

11. The method of claim 10, wherein said issue comprises network utilization.

12. The method of claim 10, wherein said issue comprises memory utilization.

13. The method of claim 10, wherein said issue comprises processor utilization.

14. The method of claim 10, wherein said issue comprises disk drive utilization.

* * * * *